United States Patent
Kajikiya et al.

(10) Patent No.: US 12,164,990 B2
(45) Date of Patent: Dec. 10, 2024

(54) ANTENNA DEVICE AND WIRELESS POWER TRANSMISSION DEVICE HAVING THE SAME

(71) Applicant: TDK Corporation, Tokyo (JP)

(72) Inventors: Shoma Kajikiya, Tokyo (JP); Noritaka Chiyo, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/734,368

(22) Filed: May 2, 2022

(65) Prior Publication Data

US 2022/0374673 A1 Nov. 24, 2022

(30) Foreign Application Priority Data

May 24, 2021 (JP) .................................. 2021-086647

(51) Int. Cl.
*G06K 19/077* (2006.01)
*H01Q 7/00* (2006.01)

(52) U.S. Cl.
CPC ... *G06K 19/0775* (2013.01); *G06K 19/07775* (2013.01); *G06K 19/07779* (2013.01); *H01Q 7/00* (2013.01)

(58) Field of Classification Search
CPC ......... G06K 19/07779; G06K 19/0775; H01Q 7/00; H01Q 3/00; H01Q 17/007; H01Q 21/00; H01Q 9/0471; H01Q 11/14
See application file for complete search history.

(56) References Cited

U.S. PATENT DOCUMENTS

| | | | | |
|---|---|---|---|---|
| 6,018,461 A | * | 1/2000 | Biermann | G06K 19/077 174/387 |
| 6,651,891 B1 | * | 11/2003 | Zakel | G06K 19/0775 235/487 |
| 9,331,378 B2 | * | 5/2016 | Merlin | H01Q 1/2225 |
| 10,796,299 B2 | * | 10/2020 | Lee | H02J 50/005 |
| 11,073,958 B2 | * | 7/2021 | Yamagishi | H01Q 7/00 |
| 11,367,942 B2 | * | 6/2022 | Matsushima | H01Q 1/2283 |
| 2002/0015002 A1 | * | 2/2002 | Yasukawa | G06K 19/0723 343/895 |
| 2002/0023964 A1 | * | 2/2002 | Okamura | G06K 19/07779 235/492 |
| 2002/0024475 A1 | * | 2/2002 | Okamura | G06K 19/07783 343/873 |

(Continued)

FOREIGN PATENT DOCUMENTS

JP 2002-298095 A 10/2002
JP 2004-118440 A 4/2004
(Continued)

*Primary Examiner* — Daniel I Walsh
(74) *Attorney, Agent, or Firm* — Rimon P.C.

(57) ABSTRACT

Disclosed herein is an antenna device that includes a first coil pattern having at least first, second, and third turns. As viewed in a coil axis direction, each of the first, second, and third turns has an opening with a width larger in a first direction than in a second direction orthogonal to the first direction. The width of the opening of the second turn in the second direction is larger than a width of the opening of the first turn in the second direction. The width of the opening of the third turn in the second direction is larger than the width of the opening of the second turn in the second direction and smaller than a width of the opening of the first turn in the first direction.

8 Claims, 7 Drawing Sheets

(56) References Cited

U.S. PATENT DOCUMENTS

| | | | | |
|---|---|---|---|---|
| 2003/0226901 A1* | 12/2003 | Kim | ................ | G06K 19/07769 |
| | | | | 235/492 |
| 2004/0256468 A1* | 12/2004 | Akiho | ................ | G06K 7/10336 |
| | | | | 235/492 |
| 2008/0245879 A1* | 10/2008 | Artigue | ............ | G06K 19/07769 |
| | | | | 235/492 |
| 2009/0033175 A1* | 2/2009 | Bruckner | ................ | G01D 5/485 |
| | | | | 310/313 R |
| 2009/0145971 A1* | 6/2009 | Yin | ................ | G06K 19/07745 |
| | | | | 235/492 |
| 2009/0159657 A1* | 6/2009 | Chen | ................ | G06K 19/07749 |
| | | | | 235/375 |
| 2009/0315680 A1* | 12/2009 | Arimura | ......... | G06K 19/07749 |
| | | | | 340/10.1 |
| 2010/0148928 A1* | 6/2010 | Yeager | ................. | G07F 7/0806 |
| | | | | 156/256 |
| 2011/0011939 A1* | 1/2011 | Seah | ............... | G06K 19/07752 |
| | | | | 156/64 |
| 2011/0285477 A1* | 11/2011 | Nakagawa | ............ | H04B 3/28 |
| | | | | 333/185 |
| 2012/0074233 A1* | 3/2012 | Finn | ................ | G06K 19/07756 |
| | | | | 235/492 |
| 2012/0313729 A1* | 12/2012 | Togashi | ................ | H03H 7/425 |
| | | | | 333/24 R |
| 2012/0326931 A1* | 12/2012 | Murayama | ....... | G06K 19/07749 |
| | | | | 343/866 |
| 2013/0075477 A1* | 3/2013 | Finn | .................... | H01Q 1/2225 |
| | | | | 29/601 |
| 2014/0152519 A1* | 6/2014 | Buyuk-Kalender | ..... | H01Q 1/38 |
| | | | | 343/749 |
| 2014/0168026 A1* | 6/2014 | Nakamura | ................ | H01F 5/04 |
| | | | | 343/788 |
| 2014/0176382 A1* | 6/2014 | Nakano | .............. | G06K 7/10178 |
| | | | | 343/788 |
| 2015/0021402 A1* | 1/2015 | Finn | .................... | H01Q 1/2225 |
| | | | | 235/492 |
| 2015/0090799 A1* | 4/2015 | Zhang | .............. | G06K 19/07754 |
| | | | | 29/601 |
| 2015/0130291 A1* | 5/2015 | Lim | .................... | H01F 27/2804 |
| | | | | 336/200 |
| 2015/0214622 A1* | 7/2015 | Tenno | ...................... | H01Q 7/00 |
| | | | | 343/788 |
| 2015/0269474 A1* | 9/2015 | Finn | ....................... | B23K 26/40 |
| | | | | 216/13 |
| 2015/0269477 A1* | 9/2015 | Finn | ................. | G06K 19/07747 |
| | | | | 235/492 |
| 2015/0280322 A1* | 10/2015 | Saito | ....................... | H02J 50/10 |
| | | | | 343/788 |
| 2015/0318609 A1* | 11/2015 | Tomonari | ................. | H01Q 7/06 |
| | | | | 343/788 |
| 2016/0118711 A1* | 4/2016 | Finn | .................... | H01Q 1/2216 |
| | | | | 343/867 |
| 2016/0276749 A1* | 9/2016 | Komachi | ................. | H01Q 1/38 |
| 2017/0346342 A1* | 11/2017 | Kim | ..................... | H01F 38/14 |
| 2018/0046893 A1* | 2/2018 | Mear | ................ | G06K 19/07769 |
| 2018/0069299 A1* | 3/2018 | Kang | ...................... | H01Q 1/243 |
| 2019/0236430 A1* | 8/2019 | Yamaoka | ............... | B65D 23/14 |
| 2020/0005114 A1* | 1/2020 | Finn | ...................... | H01Q 1/2225 |
| 2020/0083603 A1* | 3/2020 | Wu | ......................... | H01Q 7/00 |
| 2020/0210803 A1* | 7/2020 | Ochi | ....................... | H01Q 7/00 |
| 2020/0380332 A1* | 12/2020 | Matsushima | ............ | H01Q 7/00 |
| 2020/0381802 A1* | 12/2020 | Matsushima | ........... | H01L 23/66 |
| 2020/0411990 A1* | 12/2020 | Nakamura | ............. | H01Q 21/06 |
| 2021/0056374 A1* | 2/2021 | Lotya | ...................... | H04B 5/77 |
| 2021/0066802 A1* | 3/2021 | Liu | ........................ | H01Q 1/526 |
| 2022/0285841 A1* | 9/2022 | Kajikiya | ................... | H01Q 5/10 |
| 2022/0374673 A1* | 11/2022 | Kajikiya | ........... | G06K 19/07775 |
| 2022/0376396 A1* | 11/2022 | Kajikiya | ............... | H01Q 9/0414 |
| 2023/0070790 A1* | 3/2023 | Wang | .................... | H10N 97/00 |
| 2023/0088027 A1* | 3/2023 | Wang | ..................... | G06F 3/0443 |
| 2023/0118173 A1* | 4/2023 | Oh | .......................... | H02J 50/10 |
| | | | | 307/104 |
| 2023/0275351 A1* | 8/2023 | Kajikiya | .................. | H04B 5/263 |
| | | | | 343/702 |
| 2023/0395966 A1* | 12/2023 | Shimada | .......... | G06K 19/07786 |

FOREIGN PATENT DOCUMENTS

| | | |
|---|---|---|
| JP | 2014-123935 A | 7/2014 |
| JP | 2015-095656 A | 5/2015 |
| WO | 2014/077098 A1 | 5/2014 |

* cited by examiner

ANTENNA DEVICE AND WIRELESS POWER TRANSMISSION DEVICE HAVING THE SAME

CROSS-REFERENCE TO RELATED APPLICATION

This application claims the benefit of Japanese Patent Application No. 2021-086647, filed on May 24, 2021, the entire disclosure of which is incorporated by reference herein.

BACKGROUND

Field

The present disclosure relates to an antenna device and a wireless power transmission device having the same.

Description of Related Art

JP 2002-298095A discloses a reader/writer performing data communication with an IC card in a non-contact manner.

An antenna coil provided in the reader/writer described in JP 2002-298095A has a circular shape, so that communication may become unstable depending on the position of an antenna coil incorporated in an IC card.

SUMMARY

It is therefore an object of the present disclosure to provide an antenna device capable of achieving satisfactory communication characteristics irrespective of the position of an antenna coil incorporated in an IC card and a wireless power communication device having such an antenna device.

An antenna device according to the present disclosure includes a first coil pattern having at least first, second, and third turns. As viewed in the coil axis direction, each of the first, second, and third turns has an opening with a width larger in a first direction than in a second direction orthogonal to the first direction, the width of the opening of the second turn in the second direction is larger than the width of the opening of the first turn in the second direction, and the width of the opening of the third turn in the second direction is larger than the width of the opening of the second turn in the second direction and smaller than the width of the opening of the first turn in the first direction.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
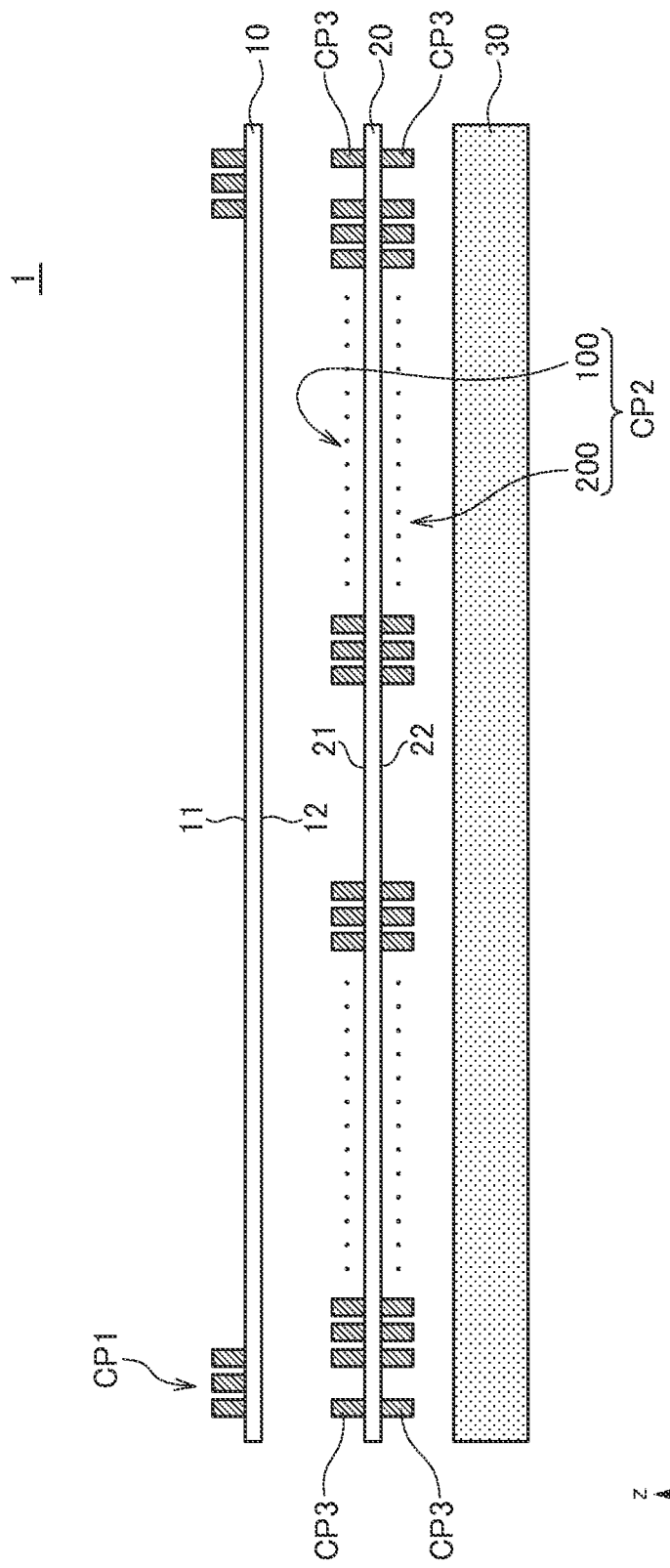
FIG. 1 is a schematic cross-sectional view for explaining the structure of an antenna device 1 according to an embodiment of the present disclosure.

FIG. 1 is a schematic cross-sectional view for explaining the structure of an antenna device 1 according to an embodiment of the present disclosure.

As illustrated in FIG. 1, the antenna device 1 according to the embodiment includes a first substrate 10 and a second substrate 20 each of which is made of a PET film, a first coil pattern CP1 provided on one surface 11 of the first substrate 10, a second coil pattern CP2 and a third coil pattern CP3 which are each provided on one surface 21 and the other surface 22 of the second substrate 20, and a magnetic sheet 30. The first coil pattern CP1 and third coil pattern CP3 are each an antenna coil for NFC (Near Field Communication), and the second coil pattern CP2 is a transmitting coil for wireless power transmission. The first coil pattern CP1 and second coil pattern CP2 overlap each other in the coil axis direction. The coil axis direction of each of the first to third coil patterns CP1 to CP3 is the z-direction, and the first substrate 10, second substrate 20, and magnetic sheet 30 are arranged in this order from the top so as to overlap one another. Specifically, the second substrate 20 is disposed between the first substrate 10 and the magnetic sheet 30, and thus the distance between the magnetic sheet 30 and the first substrate 10 in the z-direction is larger than the distance between the magnetic sheet 30 and the second substrate 20 in the z-direction.

Figure 2:
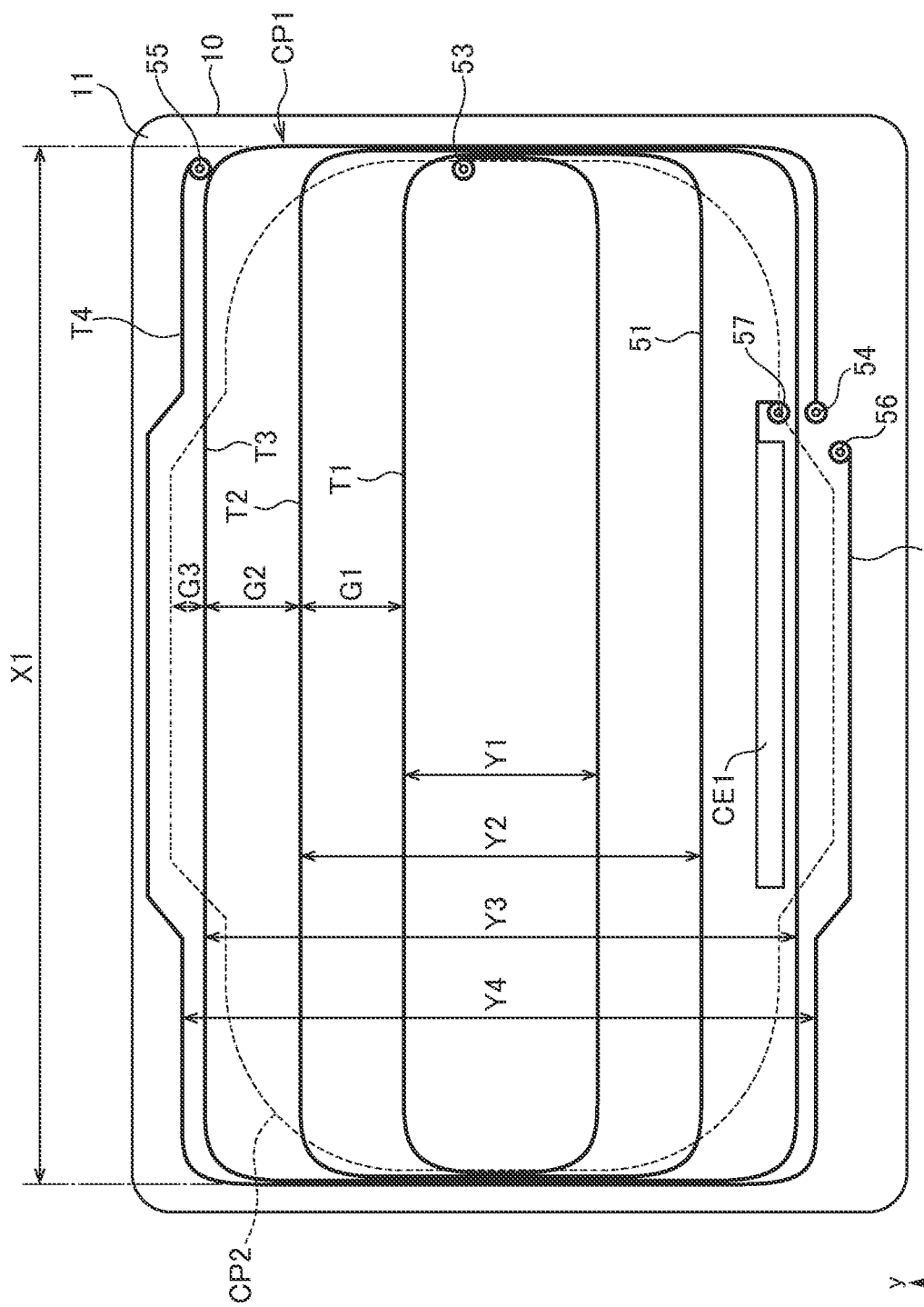
FIG. 2 is a schematic plan view illustrating the shape of a conductor pattern formed on the surface 11 of the first substrate 10.

FIG. 2 is a schematic plan view illustrating the shape of a conductor pattern formed on the surface 11 of the first substrate 10.

As illustrated in FIG. 2, there are formed, on the surface 11 of the first substrate 10, conductor patterns 51 and 52 constituting the first coil pattern CP1 and a capacitor electrode pattern CE1. The conductor pattern 51 includes a first turn T1, a second turn T2, and a third turn T3 which are each wound in a substantially rectangular shape, and one end and the other end thereof are connected respectively to through hole conductors 53 and 54 penetrating the first substrate 10. The first turn T1 is the innermost turn of the first coil pattern CP1. The opening of the first turn T1 has a width Y1 in the y-direction and a width X1 in the x-direction. The x-direction is, for example, a first direction, and the y-direction is, for example, a second direction. The second turn T2 is wound outside the first turn T1. The opening of the second turn T2 has a width Y2 in the y-direction, which is larger than the opening width Y1 of the first turn T1 (Y2>Y1). The third turn T3 is wound outside the second turn T2. The opening of the third turn T3 has a width Y3 in the y-direction, which is larger than the opening width Y2 of the second turn T2 (Y3>Y2) and smaller than the opening width X1 of the first turn T1 (Y3<X1). As described above, the opening widths of the openings of the second and third turns T2 and T3 in the x-direction are almost the same as the opening width X1 of the first turn T1. Accordingly, the first, second, and third turns T1, T2, and T3 all have a laterally elongated shape in which a section extending in the x-direction is the long side, and a section extending in the y-direction is a short side.

The conductor pattern 52 constitutes a fourth turn T4, and one end and the other end thereof are connected respectively to through hole conductors 55 and 56 penetrating the first substrate 10. The fourth turn T4 also has a laterally elongated shape in which a section extending in the x-direction is the long side, and a section extending in the y-direction is a short side. The fourth turn T4 is the outermost turn of the first coil pattern CP1. The opening of the fourth turn T4 has a width Y4 in the y-direction, which is larger than the opening width Y3 of the third turn T3 (Y4>Y3). The opening width of the fourth turn T4 in the x-direction is almost the same as the opening width X1 of the first turn T1. The capacitor electrode pattern CE1 is disposed in a y-direction gap formed between the long side of the second turn T2 and the long side of the third turn T3 as viewed in the z-direction and connected to a through hole conductor 57.

Figure 3:
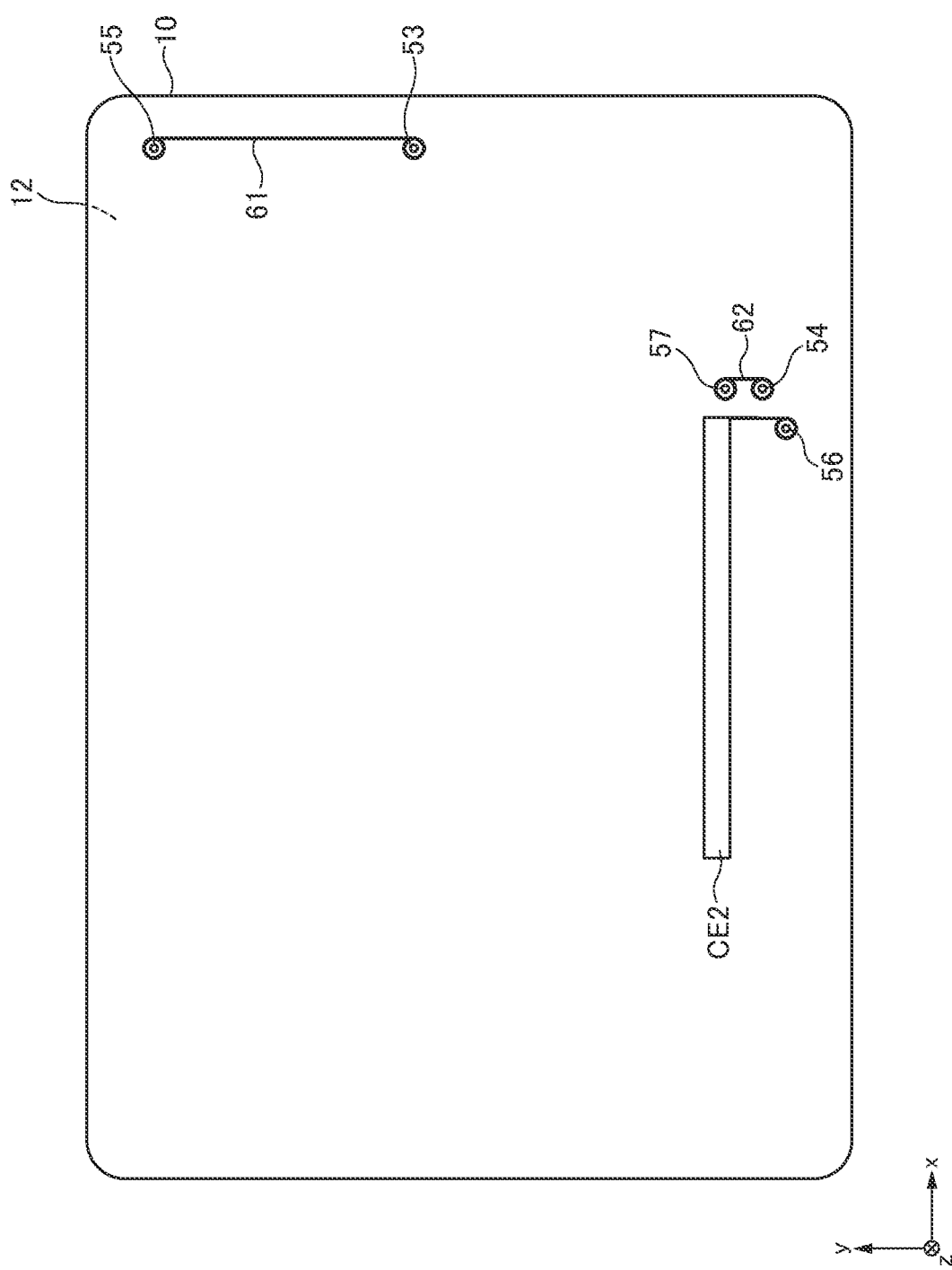
FIG. 3 is a schematic transparent plan view illustrating the shape of a conductor pattern formed on the surface 12 of the first substrate 10 as viewed from the surface 11 side of the first substrate 10.

FIG. 3 is a schematic transparent plan view illustrating the shape of a conductor pattern formed on the surface 12 of the first substrate 10 as viewed from the surface 11 side of the first substrate 10.

As illustrated in FIG. 3, there are formed, on the surface 12 of the first substrate 10, conductor patterns 61 and 62 constituting the first coil pattern CP1 and a capacitor electrode pattern CE2. Both ends of the conductor pattern 61 are connected respectively to the through hole conductors 53 and 55, whereby the one end of the conductor pattern 51 and the one end of the conductor pattern 52 are short-circuited. Further, both ends of the conductor pattern 62 are connected respectively to the through hole conductors 54 and 57, whereby the other end of the conductor pattern 51 and the capacitor electrode pattern CE1 are short-circuited. The capacitor electrode pattern CE2 is disposed at a position overlapping the capacitor electrode pattern CE1 as viewed in the z-direction. The capacitor electrode pattern CE2 is connected to the through hole conductor 56, whereby the other end of the conductor pattern 52 and the capacitor electrode pattern CE2 are short-circuited.

Figure 7:
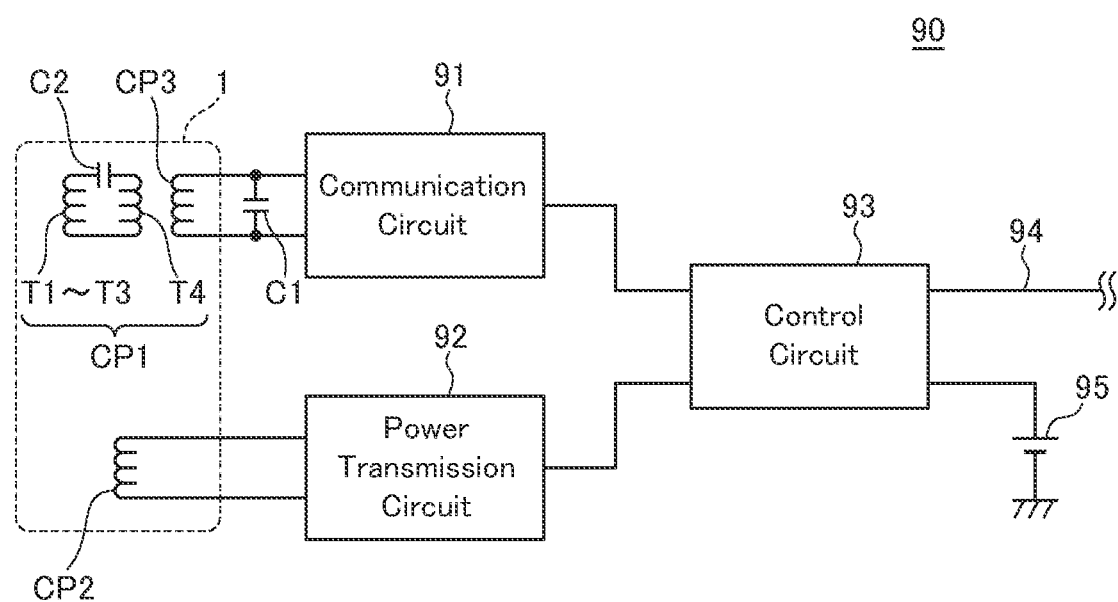
FIG. 7 is a block diagram of a wireless power transmission device 90 using the antenna device 1.

The capacitor electrode patterns CE1 and CE2 face each other through the first substrate 10 to constitute a second capacitor C2 (see FIG. 7). The first coil pattern CP1 is connected to the pair of capacitor electrode patterns CE1 and CE2 at its one end and the other end to constitute a closed circuit connected to no external circuit. The resonance frequency of the first coil pattern CP1 can be controlled by the areas of the capacitor electrode patterns CE1 and CE2. Although the first substrate 10 is disposed such that the surface 12 faces the surface of the magnetic sheet 30 in the present embodiment, it may be disposed such that the surface 11 faces the surface of the magnetic sheet 30.

Figure 4:
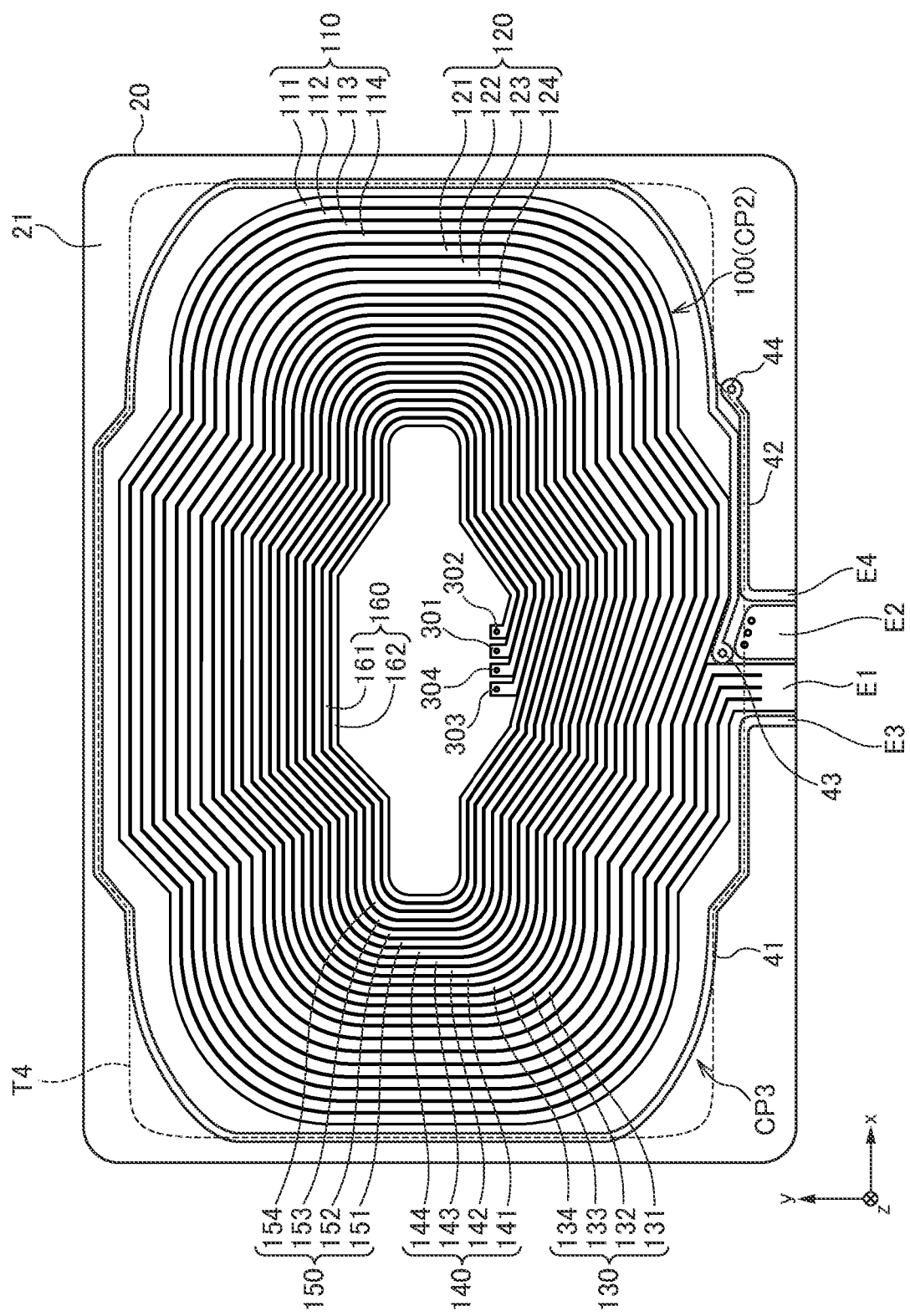
FIG. 4 is a schematic plan view illustrating the shape of a conductor pattern formed on the surface 21 of the second substrate 20.

FIG. 4 is a schematic plan view illustrating the shape of a conductor pattern formed on the surface 21 of the second substrate 20.

As illustrated in FIG. 4, there are formed, on the surface 21 of the second substrate 20, a spiral conductor pattern 100 constituting the second coil pattern CP2 and conductor patterns 41 and 42 constituting the third coil pattern CP3.

The conductor pattern 100 constituting the second coil pattern CP2 has a six-turn configuration constituted of turns 110, 120, 130, 140, 150, and 160, wherein the turns 110 and 160 are positioned at the outer and inner peripheries, respectively. The turns 110, 120, 130, 140, and 150 are each radially divided into four by three spiral slits. The turn 160 is radially divided into two by a single spiral slit. Thus, the turn 110 is divided into four lines 111 to 114, the turn 120 is divided into four lines 121 to 124, the turn 130 is divided into four lines 131 to 134, the turn 140 is divided into four lines 141 to 144, the turn 150 is divided into four lines 151 to 154, and the turn 160 is divided into two lines 161 and 162.

The lines 111, 121, 131, 141, 151, and 161 are continuous lines spirally wound in six turns and are each positioned at the outermost periphery in its corresponding turn. The lines 112, 122, 132, 142, 152, and 162 are continuous lines spirally wound in six turns and are each the second line counted from the outermost peripheral line in its corresponding turn. The lines 113, 123, 133, 143, and 153 are continuous lines spirally wound in five turns and are each the second line counted from the innermost peripheral line in its corresponding turn. The lines 114, 124, 134, 144, and 154 are continuous lines spirally wound in five turns and are each the innermost line positioned at the innermost periphery in its corresponding turn.

The outer peripheral ends of the lines 111 to 114 are connected in common to a terminal electrode E1. The inner peripheral ends of the lines 161, 162, 153, and 154 are connected respectively to through hole conductors 301 to 304 penetrating the second substrate 20.

The conductor patterns 41 and 42 constituting the third coil pattern CP3 are disposed outside the conductor pattern 100 constituting the second coil pattern CP2. The conductor pattern 41 is a continuous line wound in about one turn, and the conductor pattern 100 is disposed in the opening area (inner diameter area) of the conductor pattern 41. One end of the conductor pattern 41 is connected to a terminal electrode E3, and the other end thereof is connected to a through hole conductor 43 penetrating the second substrate 20. One end of the conductor pattern 42 is connected to a terminal electrode E4, and the other end thereof is connected to a through hole conductor 44 penetrating the second substrate 20.

Figure 5:
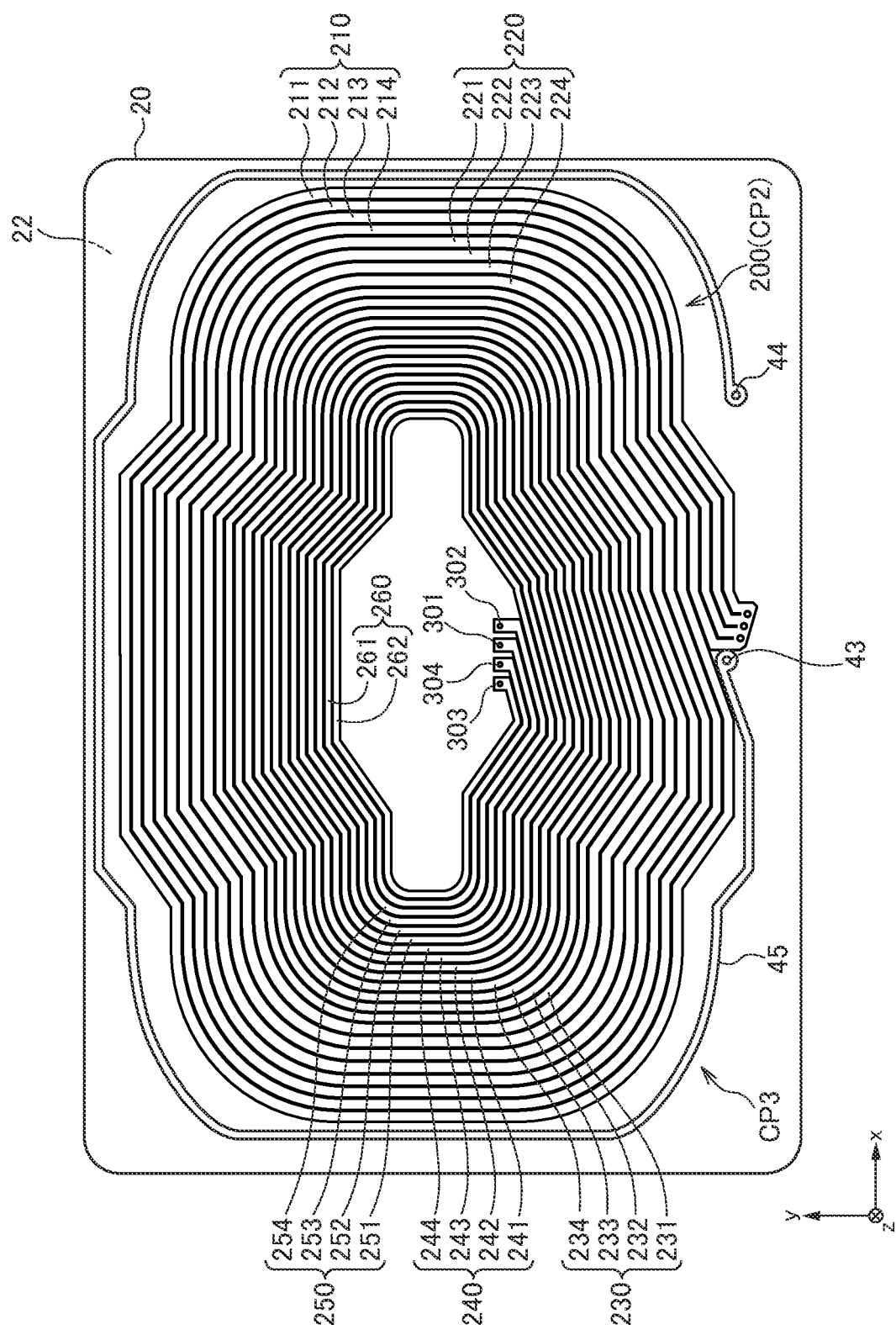
FIG. 5 is a schematic transparent plan view illustrating the shape of a conductor pattern formed on the surface 22 of the second substrate 20 as viewed from the surface 21 side of the second substrate 20.

FIG. 5 is a schematic transparent plan view illustrating the shape of a conductor pattern formed on the surface 22 of the second substrate 20 as viewed from the surface 21 side of the second substrate 20.

As illustrated in FIG. 5, there are formed, on the surface 22 of the second substrate 20, a spiral conductor pattern 200 constituting the second coil pattern CP2 and a conductor pattern 45 constituting the third coil pattern CP3. Although the second substrate 20 is disposed such that the surface 22 faces the surface of the magnetic sheet 30 in the present embodiment, it may be disposed such that the surface 21 faces the surface of the magnetic sheet 30.

The conductor pattern 200 constituting the second coil pattern CP2 has the same pattern shape as the conductor pattern 100. The conductor pattern 200 has a six-turn configuration constituted of turns 210, 220, 230, 240, 250, and 260, wherein the turns 210 and 260 are positioned at the outer and inner peripheries, respectively. The turns 210, 220, 230, 240, and 250 are each radially divided into four by three spiral slits. The turn 260 is radially divided into two by a single spiral slit. Thus, the turn 210 is divided into four lines 211 to 214, the turn 220 is divided into four lines 221 to 224, the turn 230 is divided into four lines 231 to 234, the turn 240 is divided into four lines 241 to 244, the turn 250 is divided into four lines 251 to 254, and the turn 260 is divided into two lines 261 and 262.

The lines 211, 221, 231, 241, 251, and 261 are continuous lines spirally wound in six turns and are each positioned at the outermost periphery in its corresponding turn. The lines 212, 222, 232, 242, 252, and 262 are continuous lines spirally wound in six turns and are each the second line counted from the outermost peripheral line in its corresponding turn. The lines 213, 223, 233, 243, and 253 are continuous lines spirally wound in five turns and are each the second line counted from the innermost peripheral line in its corresponding turn. The lines 214, 224, 234, 244, and 254 are continuous lines spirally wound in five turns and are each the innermost line positioned at the innermost periphery in its corresponding turn.

The outer peripheral ends of the lines 211 to 214 are connected in common to a terminal electrode E2 via through hole conductors. The inner peripheral ends of the lines 261, 262, 253, and 254 are connected respectively to the through hole conductors 304, 303, 302, and 301. As a result, four lines each having 11 turns are connected in parallel between the terminal electrodes E1 and E2.

The conductor pattern 45 constituting the third coil pattern CP3 is a continuous line wound in about one turn and disposed outside the conductor pattern 200 constituting the second coil pattern CP2. That is, the conductor pattern 200 is disposed in the opening area (inner diameter area) of the conductor pattern 45. One end and the other end of the conductor pattern 45 are connected respectively to the through hole conductors 43 and 44. As a result, the third coil pattern CP3 has about two turns in total.

As denoted by the dashed line in FIG. 4, the third coil pattern CP3 partly overlaps the fourth turn T4 of the first coil pattern CP1, whereby the first coil pattern CP1 is coupled to the third coil pattern CP3. Unlike the second and third coil patterns CP2 and CP3, the first coil pattern CP1 does not have a terminal electrode for external connection and constitutes a closed circuit formed by the conductor patterns formed on the surfaces 11 and 12 of the first substrate 10. The first coil pattern CP1 functions as a booster antenna by being coupled to the third coil pattern CP3. That is, in the present embodiment, NFC-based communication is achieved by the third coil pattern CP3 as a main antenna and the first coil pattern CP1 as a booster antenna.

The first coil pattern CP1 as a booster antenna has the first turn T1 having the opening width Y1 in the y-direction, the second turn T2 having the opening width Y2 (>Y1) in the y-direction, and the third turn T3 having the opening width Y3 (>Y2) in the y-direction, wherein the opening width Y3 of the third turn T3 in the y-direction is smaller than the opening width X1 of the first turn T1 in the x-direction. This can enhance communication characteristics for an IC card having a laterally elongated shape like a credit card and make communication characteristics satisfactory irrespective of the y-direction position of an antenna coil incorporated in such an IC card.

Further, as denoted by the dashed line in FIG. 2, the first turn T1 of the first coil pattern CP1 entirely overlaps the pattern area of the second coil pattern CP2 in the z-direction, whereas the second and third turns T2 and T3 of the first coil pattern CP1 each do not partly overlap the pattern area of the second coil pattern CP2. The pattern area of the second coil pattern CP2 refers to the area where the conductor pattern constituting the second coil pattern CP2 exists in a plan view, and the dimension in a direction (radial direction) orthogonal to the extending direction (peripheral direction) of the conductor pattern is the winding width of the pattern area. This reduces coupling between the first and second coil patterns CP1 and CP2 while reducing the planar size of the first coil pattern CP1, whereby satisfactory communication characteristics can be obtained.

Assuming that a gap in the y-direction between the long side of the first turn T1 and the long side of the second turn T2 is G1, a gap in the y-direction between the long side of the second turn T2 and the long side of the third turn T3 is G2, and a gap in the y-direction between the long side of the third turn T3 and the long side of the fourth turn T4 is G3, the gaps G1 and G2 are almost the same as each other and each about half the opening width Y1, and the gap G3 is smaller than the gaps G1 and G2. This can make communication characteristics satisfactory irrespective of the y-direction position of an antenna coil incorporated in the IC card and reduce the y-direction size of the antenna device 1. Further, as illustrated in FIG. 2, the fourth turn T4 of the first coil pattern CP1 is enlarged in opening width in the y-direction at the center portion in the x-direction so as not to overlap the second coil pattern CP2. This makes it possible to increase coupling between the first coil pattern CP1 and the third coil pattern CP3 while reducing coupling between the first coil pattern CP1 and the second coil pattern CP2.

Further, the capacitor electrode patterns CE1 and CE2 overlap the pattern area of the second coil pattern CP2 as viewed in the z-direction. This makes magnetic flux generated from the second coil pattern CP2 less likely to be applied to the capacitor electrode patterns CE1 and CE2, thereby reducing an eddy current. In particular, the capacitor electrode patterns CE1 and CE2 are disposed in the y-direction gap between the long side of the second turn T2 of the first coil pattern CP1 and the long side of the third turn T3 as viewed in the z-direction and, accordingly, the positions of the capacitor electrode patterns CE1 and CE2 are offset outward from the center position of the winding width of the pattern area of the second coil pattern CP2. This increases the distance between the opening area of the second coil pattern CP2 where the density of magnetic flux generated from the second coil pattern CP2 is highest and the capacitor electrode patterns CE1 and CE2 to thereby effectively reduce an eddy current.

Figure 6:
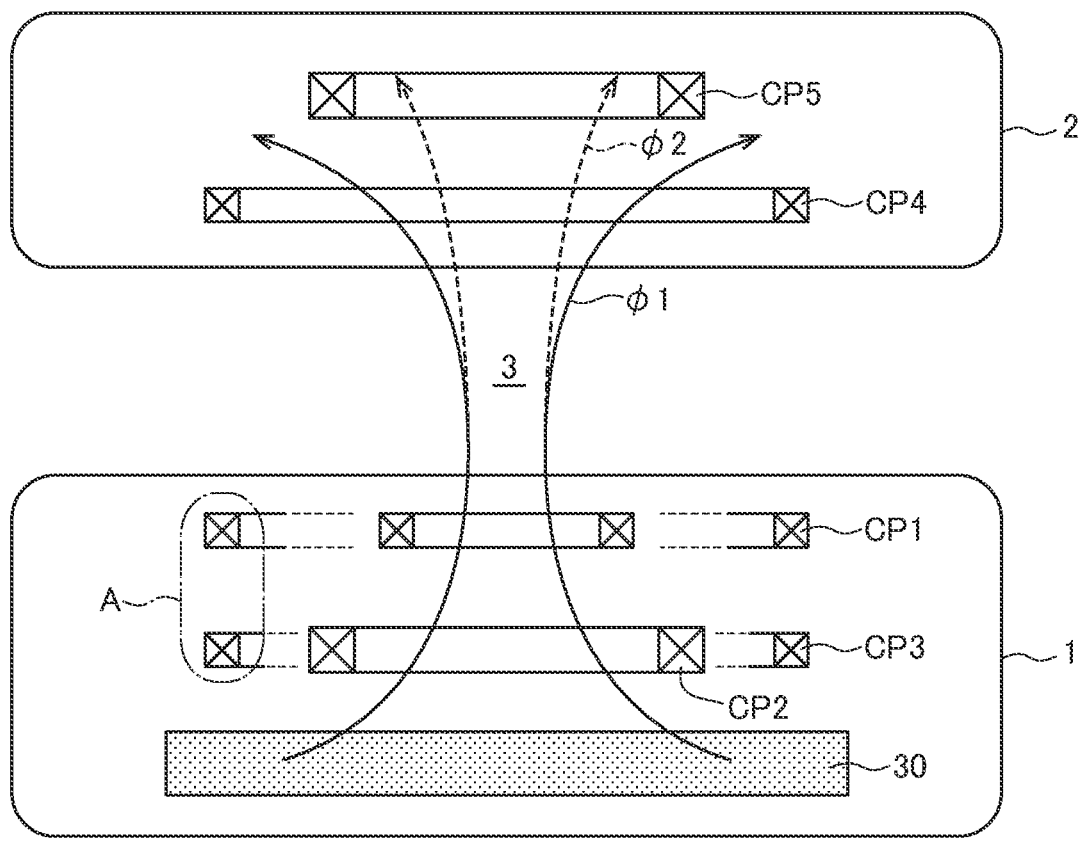
FIG. 6 is a schematic view for explaining the function of the antenna device 1.

FIG. 6 is a schematic view for explaining the function of the antenna device 1.

As illustrated in FIG. 6, when the antenna device 1 according to the present embodiment and a counterpart device 2 as a communication target are made to face each other through a space 3, magnetic flux $\phi 1$ generated from the first and third coil patterns CP1 and CP3 interlinks a fourth coil pattern CP4 included in the counterpart device 2, thereby achieving NFC-based wireless communication. Signals transmitted by wireless communication are supplied to the third coil pattern CP3 through the terminal electrodes E3 and E4. The third coil pattern CP3 as a main antenna is coupled to the first coil pattern CP1 as denoted by the symbol A in FIG. 6. Thus, signals are supplied also to the first coil pattern CP1 as a booster antenna. Magnetic flux $\phi 2$ generated from the second coil pattern CP2 interlinks a fifth coil pattern CP5 included in the counterpart device 2, thereby achieving wireless power transmission.

FIG. 7 is a block diagram of a wireless power transmission device 90 using the antenna device 1 according to the present embodiment.

The wireless power transmission device 90 illustrated in FIG. 7 includes the antenna device 1 having the first to third coil patterns CP1 to CP3, a communication circuit connected to the third coil pattern CP3, and a power transmission circuit 92 connected to the second coil pattern CP2. The communication circuit 91 and power transmission circuit 92 are connected to a control circuit 93. Thus, data to be transmitted/received through a communication line 94 can communicate through the first and third coil patterns CP1 and CP3 for NFC, and power supplied from a power supply 95 can be transmitted wirelessly through the second coil pattern CP2 adapted for wireless power transmission. In the present embodiment, the third coil pattern CP3 of the antenna device 1 is connected to the communication circuit 91; however, the first coil pattern CP1 may be connected to the communication circuit 91 with the third coil pattern CP3 omitted to achieve NFC-based communication using the first coil pattern CP1 as a main antenna.

As illustrated in FIG. 7, the first coil pattern CP1 is connected with the second capacitor C2, and the third coil pattern CP3 is connected with a first capacitor C1. In FIG. 7, the first capacitor C1 is connected in parallel to the second coil pattern CP2; however, in place of or in addition to this, the first capacitor C1 may be connected in series to the second coil pattern CP2.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples, but not limited thereto.

An antenna device according to the present disclosure includes a first coil pattern having at least first, second, and third turns. As viewed in the coil axis direction, each of the first, second, and third turns has an opening with a width larger in a first direction than in a second direction orthogonal to the first direction, the width of the opening of the second turn in the second direction is larger than the width of the opening of the first turn in the second direction, and the width of the opening of the third turn in the second direction is larger than the width of the opening of the second turn in the second direction and smaller than the width of the opening of the first turn in the first direction. With this configuration, there can be provided an antenna device capable of achieving satisfactory communication characteristics irrespective of the position of an antenna coil incorporated in an IC card.

The antenna device according to the present disclosure may further include a second coil pattern overlapping the first coil pattern in the coil axis direction, and each of the second and third turns of the first coil pattern may have a section overlapping the second coil pattern in the coil axis direction and another section not overlapping the second coil pattern in the coil axis direction. This reduces coupling between the first and second coil patterns while reducing the planar size of the first coil pattern, whereby satisfactory communication characteristics can be obtained.

The antenna device according to the present disclosure may further include: a first substrate on which the first coil pattern is formed; a second substrate on which the second coil pattern is formed; a pair of capacitor electrode patterns provided respectively on one surface and the other surface of the first substrate so as to face each other through the first substrate; and a third coil pattern provided on one surface or the other surface of the second substrate so as to surround the second coil pattern. The first coil pattern may be connected to the pair of capacitor electrode patterns at its one end and the other end to constitute a closed circuit and may further include a fourth turn positioned outside the third turn and at least partly overlap the third coil pattern as viewed in the coil axis direction. Thus, the third coil pattern functions as a main antenna, and the first coil pattern functions as a booster antenna.

As viewed in the coil axis direction, the width of the opening of the fourth turn may be larger in the first direction than in the second direction, and a gap in the second direction between the section of the fourth turn that extends in the first direction and the section of the third turn that extends in the first direction may be narrower than a gap in the second direction between the section of the third turn that extends in the first direction and the section of the second turn that extends in the first direction. This can make communication characteristics satisfactory irrespective of the second direction position of an antenna coil incorporated in an IC card and reduce the second direction size of the antenna device.

Further, the pair of capacitor electrode patterns may be disposed in a gap in the second direction between the section of the third turn that extends in the first direction and the section of the second turn that extends in the first direction, as viewed in the coil axis direction. This can reduce the influence of an eddy current.

Further, a wireless power transmission device according to the present disclosure includes: the above-described antenna device; a communication circuit connected to the third coil pattern; and a power transmission circuit connected to the second coil pattern. With this configuration, wireless power transmission and NFC-based communication can be achieved.

What is claimed is:

1. An antenna device comprising:
a first coil pattern having a first end and a second end, and at least consecutively-wound first, second, and third loops between the first end and the second end; and
a second coil pattern overlapping the first coil pattern in a coil axis direction,
wherein the first loop is disposed as an innermost, and the third loop is disposed as an outermost, among the first to third loops,
wherein each of the first, second, and third loops includes a first section extending in a first direction and a second section extending in a second direction orthogonal to the first direction,
wherein, as viewed in the coil axis direction, each of the first, second, and third loops has an opening with a width larger in the first direction than in the second direction,
wherein a width of the opening of the second loop in the second direction is larger than a width of the opening of the first loop in the second direction,
wherein a width of the opening of the third loop in the second direction is larger than the width of the opening of the second loop in the second direction and smaller than a width of the opening of the first loop in the first direction,
wherein a gap between the first section of the first loop and the first section of the second loop in the second direction is larger than a gap between the second section of the first loop and the second section of the second loop in the first direction,
wherein a gap between the first section of the second loop and the first section of the third loop in the second direction is larger than a gap between the second section of the second loop and the second section of the third loop in the first direction,
wherein each of the second and third loops of the first coil pattern has a section overlapping the second coil pattern in the coil axis direction and another section not overlapping the second coil pattern in the coil axis direction.

2. The antenna device as claimed in claim 1, further comprising:
a first substrate on which the first coil pattern is formed;
a second substrate on which the second coil pattern is formed;
a pair of capacitor electrode patterns provided respectively on one surface and another surface of the first substrate so as to face each other through the first substrate; and
a third coil pattern provided on one surface or another surface of the second substrate so as to surround the second coil pattern,
wherein the first coil pattern is connected to the pair of capacitor electrode patterns at its one and another end to constitute a closed circuit, and
wherein the first coil pattern further includes a fourth loop positioned outside the third loop and at least partly overlap the third coil pattern as viewed in the coil axis direction.

3. The antenna device as claimed in claim 2,
wherein, as viewed in the coil axis direction, a width of an opening of the fourth loop is larger in the first direction than in the second direction, and
wherein a gap in the second direction between a section of the fourth loop that extends in the first direction and a section of the third loop that extends in the first direction is narrower than a gap in the second direction between the section of the third loop that extends in the first direction and a section of the second loop that extends in the first direction.

4. The antenna device as claimed in claim 3, wherein the pair of capacitor electrode patterns are disposed in a gap in the second direction between the section of the third loop that extends in the first direction and the section of the second loop that extends in the first direction, as viewed in the coil axis direction.

5. A wireless power transmission device comprising:
an antenna device comprising:
a first substrate on which a first coil pattern is formed;
a second substrate on which a second coil pattern overlapping the first coil pattern in a coil axis direction is formed;
a pair of capacitor electrode patterns provided respectively on one surface and another surface of the first substrate so as to face each other through the first substrate; and
a third coil pattern provided on one surface or another surface of the second substrate so as to surround the second coil pattern;
a communication circuit connected to the third coil pattern; and
a power transmission circuit connected to the second coil pattern,
wherein the first coil pattern has first, second, third, and fourth loops,
wherein, as viewed in the coil axis direction, each of the first, second, and third loops has an opening with a width larger in a first direction than in a second direction orthogonal to the first direction,
wherein a width of the opening of the second loop in the second direction is larger than a width of the opening of the first loop in the second direction,
wherein a width of the opening of the third loop in the second direction is larger than the width of the opening of the second loop in the second direction and smaller than a width of the opening of the first loop in the first direction,
wherein each of the second and third loops of the first coil pattern has a section overlapping the second coil pattern in the coil axis direction and another section not overlapping the second coil pattern in the coil axis direction,
wherein the first coil pattern is connected to the pair of capacitor electrode patterns at its one and another end to constitute a closed circuit, and
wherein the fourth loop of the first coil pattern is positioned outside the third loop and at least partly overlap the third coil pattern as viewed in the coil axis direction.

6. An antenna device comprising:
a first coil pattern having at least first, second, and third loops;
a second coil pattern overlapping the first coil pattern in a coil axis direction;
a first substrate on which the first coil pattern is formed;
a second substrate on which the second coil pattern is formed;
a pair of capacitor electrode patterns provided respectively on one surface and another surface of the first substrate so as to face each other through the first substrate; and
a third coil pattern provided on one surface or another surface of the second substrate so as to surround the second coil pattern,
wherein, as viewed in the coil axis direction, each of the first, second, and third loops has an opening with a width larger in a first direction than in a second direction orthogonal to the first direction,
wherein a width of the opening of the second loop in the second direction is larger than a width of the opening of the first loop in the second direction,
wherein a width of the opening of the third loop in the second direction is larger than the width of the opening of the second loop in the second direction and smaller than a width of the opening of the first loop in the first direction,
wherein each of the second and third loops of the first coil pattern has a section overlapping the second coil pattern in the coil axis direction and another section not overlapping the second coil pattern in the coil axis direction,
wherein the first coil pattern is connected to the pair of capacitor electrode patterns at its one and another end to constitute a closed circuit, and
wherein the first coil pattern further includes a fourth loop positioned outside the third loop and at least partly overlap the third coil pattern as viewed in the coil axis direction.

7. The antenna device as claimed in claim 6,
wherein, as viewed in the coil axis direction, a width of an opening of the fourth loop is larger in the first direction than in the second direction, and
wherein a gap in the second direction between a section of the fourth loop that extends in the first direction and a section of the third loop that extends in the first direction is narrower than a gap in the second direction between the section of the third loop that extends in the first direction and a section of the second loop that extends in the first direction.

8. The antenna device as claimed in claim 7, wherein the pair of capacitor electrode patterns are disposed in a gap in the second direction between the section of the third loop that extends in the first direction and the section of the second loop that extends in the first direction, as viewed in the coil axis direction.

\* \* \* \* \*